United States Patent
Nakagawa et al.

(10) Patent No.: US 12,307,170 B2
(45) Date of Patent: May 20, 2025

(54) VIBRATION NOISE REDUCTION ANALYSIS METHOD AND ANALYZER FOR AUTOMOTIVE PANEL PARTS

(71) Applicant: JFE STEEL CORPORATION, Tokyo (JP)

(72) Inventors: Koichi Nakagawa, Tokyo (JP); Takanobu Saito, Tokyo (JP); Tsuyoshi Shiozaki, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 729 days.

(21) Appl. No.: 17/761,025

(22) PCT Filed: May 7, 2020

(86) PCT No.: PCT/JP2020/018489
§ 371 (c)(1),
(2) Date: Mar. 16, 2022

(87) PCT Pub. No.: WO2021/053872
PCT Pub. Date: Mar. 25, 2021

(65) Prior Publication Data
US 2022/0350940 A1    Nov. 3, 2022

(30) Foreign Application Priority Data
Sep. 19, 2019   (JP) .................. 2019-170362

(51) Int. Cl.
*G06F 30/15*    (2020.01)
*B62D 25/20*    (2006.01)
(Continued)

(52) U.S. Cl.
CPC ............. *G06F 30/15* (2020.01); *B62D 25/20* (2013.01); *G06F 30/20* (2020.01); *G06F 2119/10* (2020.01)

(58) Field of Classification Search
CPC ...... G06F 30/15; G06F 30/20; G06F 2119/10; B62D 25/20
(Continued)

(56) References Cited

U.S. PATENT DOCUMENTS

| | | | |
|---|---|---|---|
| 7,270,366 B2 | 9/2007 | Kamura et al. | |
| 2005/0116507 A1* | 6/2005 | Kamura | G10K 11/175 296/193.07 |

FOREIGN PATENT DOCUMENTS

| | | |
|---|---|---|
| CN | 110226161 A | 9/2019 |
| JP | 2010-228718 A | 10/2010 |

(Continued)

OTHER PUBLICATIONS

Nov. 29, 2023 Office Action and Search Report issued in Chinese Patent Application No. 202080064993.2.
(Continued)

*Primary Examiner* — Brian S Cook
(74) *Attorney, Agent, or Firm* — Oliff PLC

(57) ABSTRACT

A vibration noise reduction analysis method for automotive panel parts acquires optimal distribution of beads to be provided in an automotive panel part to reduce noise caused by vibration of the panel part. The vibration noise reduction analysis method is executed by a computer, and includes: an automotive body analysis model acquiring step; an analysis condition setting step; a single-bead arranged area setting step; a bead parameter distribution acquiring step; an equivalent radiated power (ERP) reacquisition step; a bead parameter distribution acquisition step on a minimum ERP in bead-arranged area; and an optimal bead distribution determination step. The bead parameter distribution acquiring step includes: a bead parameter selection step; a bead parameter distribution analysis model generation step; and a bead parameter design variable distribution analysis step.

2 Claims, 8 Drawing Sheets

(51) Int. Cl.
  *G06F 30/20* (2020.01)
  *G06F 119/10* (2020.01)

(58) Field of Classification Search
  USPC .............................................................. 703/1
  See application file for complete search history.

(56) References Cited

FOREIGN PATENT DOCUMENTS

| JP | 2014-48886 A | 3/2014 |
| JP | 2015-185142 A | 10/2015 |
| JP | 2015-185143 A | 10/2015 |
| JP | 2019-114114 A | 7/2019 |
| JP | 2019-128868 A | 8/2019 |

OTHER PUBLICATIONS

Oct. 27, 2022 Extended Search Report issued in European Patent Application No. 20865408.7.
Structural optimization design software Altair OptiStruct, https://www.terrabyte.co.jp/Hyper/OptiStruct-3.htm, 2018.
Shimizu et. al "Quietness Development for New CX-9," Matsuda Technical Report No. 33, p. 33-38, 2016.
Aug. 4, 2020 International Search Report issued in International Patent Application No. PCT/JP2020/018489.
Oct. 17, 2024 Office Action issued in Korean Patent Application No. 10-2022-7008368.
Maressa, A. et al.; "NVH optimization methodologies based on bead modification analysis in vehicle body design"; LMS International, CAE Division; pp. 4319-4336.
Kim, H. et al.; "Topography optimization of an enclosure panel for low-frequency noise and vibration reduction using the equivalent radiated power approach"; Materials and Design; vol. 183; 2019; pp. 1-9.

* cited by examiner

FIG.9
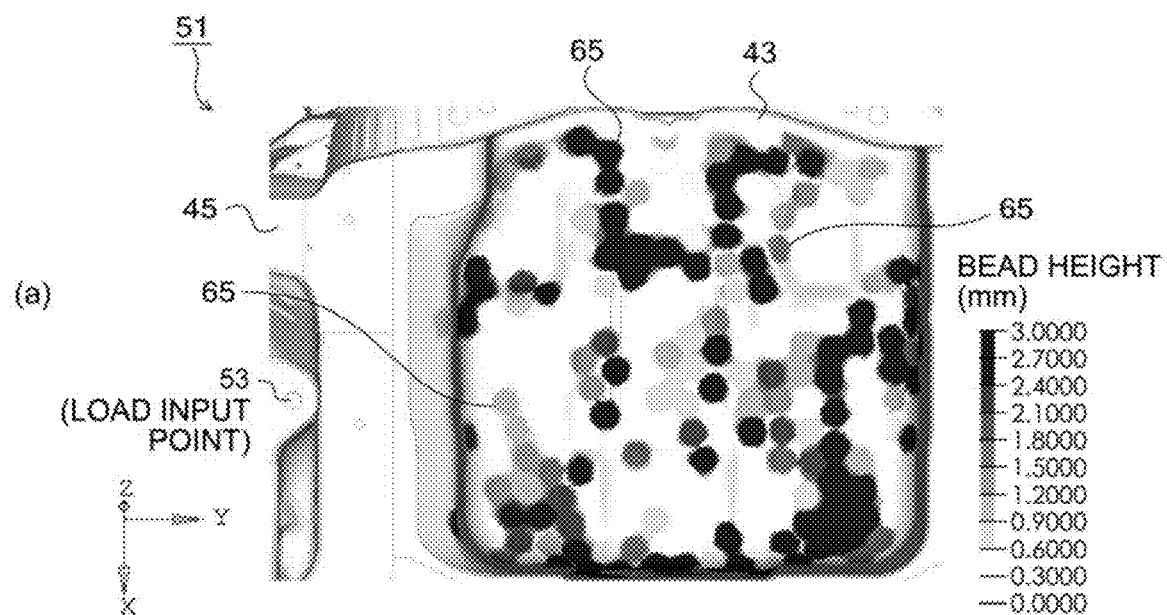
(a)
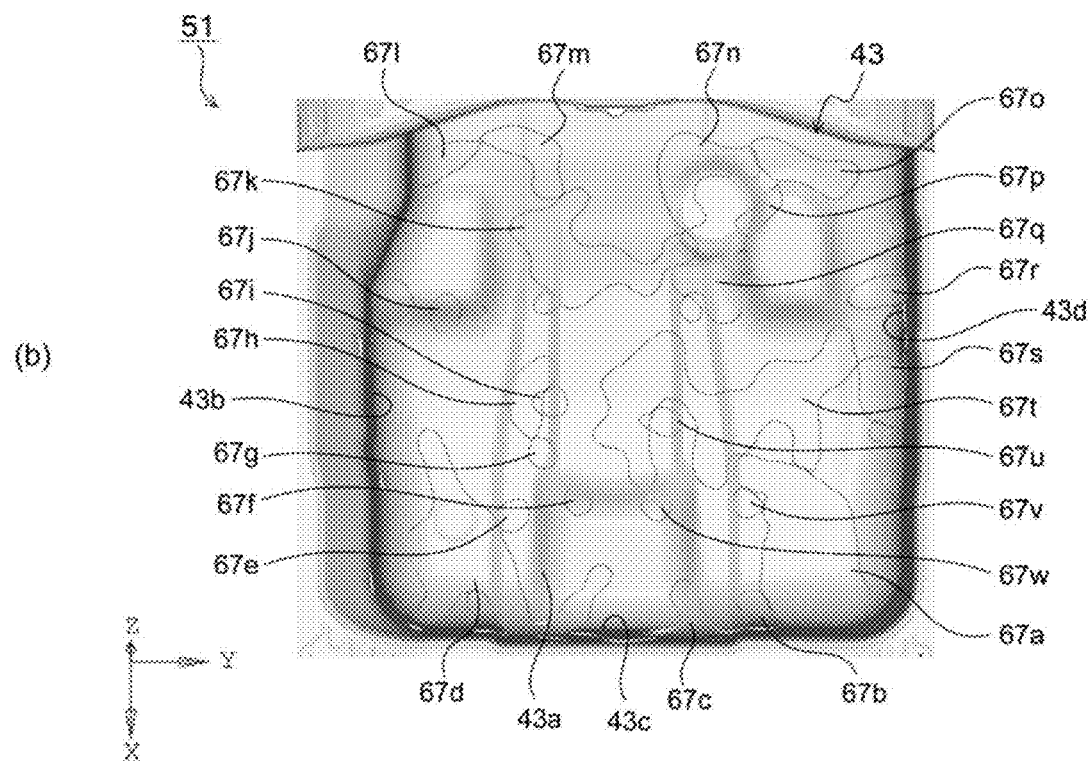
(b)

US 12,307,170 B2

VIBRATION NOISE REDUCTION ANALYSIS METHOD AND ANALYZER FOR AUTOMOTIVE PANEL PARTS

FIELD

The present invention relates to a vibration noise reduction analysis method and an analyzer for automotive panel parts, more particularly to a vibration noise reduction analysis method and an analyzer for automotive panel parts that acquire optimal distribution of beads to be provided in an automotive panel part to reduce noise caused by the vibration of the panel part. In the present application, the bead distribution refers to the bead parameters (position, bead shape at each position, size (e.g., length, width, height), angle, and orientation) regarding beads to be provided in the panel part.

BACKGROUND

Vibrations of an automotive panel part, such as an automotive floor panel and a dash lower panel, may be a source of road noise and booming noise and exacerbate the noise in the cabin. As such, the reduction of the noise in the cabin has become an issue in improving the commercial value of automobiles.

For example, as a technique for reducing noise in the cabin caused by the vibration of a panel part, Patent Literature 1 discloses a structure in which a bead is provided in an automotive body frame part located in the transmission path through which vibration is transmitted from the left and right side members of the automotive body to the front cowl, so that the bead functions as a breakpoint of the vibration transmission. However, with this technique, although it is possible to shut off the vibration for a transmission path in a specific vibration mode, vibration cannot be shut off for another transmission path in a different vibration mode.

Conventionally, as a technique for directly reducing the noise and vibration of a panel part, a technique is considered effective that increases the surface rigidity and changes the eigenfrequency by forming a pattern of beads (protruding portions or recessed portions) in the panel part or by increasing the thickness of the panel. However, this is conventionally inefficient because beads (protruding portions or recessed portions) are empirically arranged. Also, the conventional measure that increases the thickness of a panel part suffers the problem of a lower fuel efficiency caused by an increase in the automotive body weight. In regard to these problems, Non Patent Literature 1 discloses analysis software that acquires an optimal shape of a bead to be provided in a panel. Also, Non Patent Literature 2 discloses an example in which the road noise of a vehicle is reduced by reducing the vibration level of an automotive panel.

CITATION LIST

Patent Literature

Patent Literature 1: Japanese Patent Application Laid-open No. 2010-228718

Non Patent Literature

Non Patent Literature 1: "Structural optimization design software Altair OptiStruct", [online], [Searched Jul. 18, 2019], Internet <URL: https://www.terrabyte.co.jp/Hyper/OptiStruct-3.htm>

Non Patent Literature 2: Katsuya Shimizu, five others, "Quietness development for new CX-9", Mazda Technical Report, No. 33, pp.33-38 (2016)

SUMMARY

Technical Problem

However, although Non Patent Literature 1 discloses an example of analysis software that acquires only the position of beads by selecting one of the shape and size of beads as bead parameters, and the result of this analysis, neither Non Patent Literature 1 nor Non Patent Literature 2 discloses how to acquire, for beads to be provided in an automotive panel part to reduce noise caused by the vibration of the panel part, the bead distribution (position, shape, size, angle, and orientation) that is optimal for an actual panel part and enables practical manufacturing.

The present invention has been made to solve the above-mentioned problems, and it is an objective of the present invention to provide a vibration noise reduction analysis method and an analyzer for automotive panel parts that can efficiently acquire, for a bead to be provided in an automotive panel part to reduce noise caused by the vibration of the panel part, optimal bead distribution (position, shape, size, angle, and orientation) that enables practical manufacturing.

Solution to Problem

A vibration noise reduction analysis method according to the present invention for automotive panel parts, the method acquiring optimal distribution of beads to be provided in an automotive panel part to reduce noise caused by vibration of the panel part, and being executed by a computer, includes: an automotive body analysis model acquisition step of acquiring an automotive body analysis model including a panel part model in which the automotive panel part is modeled with a two-dimensional element; an analysis condition setting step of setting a bead parameter distribution analysis condition for optimization analysis that acquires bead parameter distribution regarding a bead to be provided in the panel part model, and a vibration condition in vibration mode analysis; a single bead-arranged area setting step of setting a single bead-arranged area among a plurality of bead-arranged areas in which the panel part model is provided with the bead; a bead parameter distribution acquisition step of acquiring the bead parameter distribution to be provided in the set single bead-arranged area under the bead parameter distribution analysis condition including equivalent radiated power (ERP) calculated by the vibration mode analysis under the vibration condition; an equivalent radiated power (ERP) reacquisition step of reacquiring equivalent radiated power (ERP) of the panel part model in which the acquired bead parameter distribution is set; bead parameter distribution acquisition step on a minimum ERP in bead-arranged area of changing a bead parameter to be acquired in the bead parameter distribution acquisition step, repeating the bead parameter distribution acquisition step and the equivalent radiated power (ERP) reacquisition step, and acquiring bead parameter distribution with which the ERP is minimized for the set single bead-arranged area; and an optimal bead distribution determination step of changing the single bead-arranged area in the panel part model, repeating the single bead-arranged area setting step, the bead parameter distribution acquisition step, the equivalent radiated power (ERP) reacquisition step, and the bead parameter distribution acquisition step on a minimum ERP in bead-arranged area, and determining a bead-arranged area in the panel part model and the bead parameter distribution acquired for this bead-arranged area as optimal bead distribution to be provided in the panel part, wherein the bead parameter distribution acquisition step includes: a bead parameter selection step of selecting one bead parameter regarding a bead to be provided in the set single bead-arranged area; a bead parameter distribution analysis model generation step of setting the selected one bead parameter in the automotive body analysis model as a design variable and generating a bead parameter distribution analysis model for calculating the bead parameter distribution to be provided in the single bead-arranged area; and a bead parameter design variable distribution analysis step of performing optimization analysis by assigning, to the generated bead parameter distribution analysis model, the bead parameter distribution analysis conditions that are set in the analysis condition setting step and includes equivalent radiated power (ERP) calculated by the vibration mode analysis under the vibration condition, and acquiring the optimal bead parameter distribution using the selected one bead parameter as a design variable, and the optimal bead distribution determination step includes acquiring, for each single bead-arranged area set in the single bead-arranged area setting step, bead parameter distribution with which the ERP of the panel part model is minimized, and determining a bead-arranged area with which the ERP is minimized and the bead parameter distribution acquired for this bead-arranged area as optimal distribution of beads to be provided in the panel part.

A vibration noise reduction analyzer according to the present invention for automotive panel parts, the vibration noise reduction analyzer being configured to acquire optimal distribution of beads to be provided in an automotive panel part to reduce noise caused by vibration of the panel part, includes: an automotive body analysis model acquisition unit configured to acquire an automotive body analysis model including a panel part model in which the automotive panel part is modeled with a two-dimensional element; an analysis condition setting unit configured to set a bead parameter distribution analysis condition for optimization analysis that acquires bead parameter distribution regarding a bead to be provided in the panel part model, and a vibration condition in vibration mode analysis; a single bead-arranged area setting unit configured to set a single bead-arranged area among a plurality of bead-arranged areas in which the panel part model is provided with the bead; a bead parameter distribution acquisition unit configured to acquire the bead parameter distribution to be provided in the set single bead-arranged area under the bead parameter distribution analysis condition including equivalent radiated power (ERP) calculated by the vibration mode analysis under the vibration condition; an equivalent radiated power (ERP) reacquisition unit configured to reacquire equivalent radiated power (ERP) of the panel part model in which the acquired bead parameter distribution is set; a bead parameter distribution acquisition unit on a minimum ERP in bead-arranged area configured to change a bead parameter to be acquired by the bead parameter distribution acquisition unit, repeat processes of the bead parameter distribution acquisition unit and the equivalent radiated power (ERP) reacquisition unit, and acquire bead parameter distribution with which the ERP is minimized for the set single bead-arranged area; and an optimal bead distribution determination unit configured to change the single bead-arranged area in the panel part model, repeat processes performed by the single bead-arranged area setting unit, the bead parameter distribution acquisition unit, the equivalent radiated power (ERP) reacquisition unit, and the minimum ERP bead parameter distribution acquisition unit on a minimum ERP in bead-arranged area, and determine a bead-arranged area in the panel part model and the bead parameter distribution acquired for this bead-arranged area as optimal bead distribution to be provided in the panel part, wherein the bead parameter distribution acquisition unit includes: a bead parameter selection unit configured to select one bead parameter regarding a bead to be provided in the set single bead-arranged area; a bead parameter distribution analysis model generation unit configured to set the selected one bead parameter in the automotive body analysis model as a design variable and generates a bead parameter distribution analysis model for calculating the bead parameter distribution to be provided in the single bead-arranged area; and a bead parameter design variable distribution analysis unit configured to perform optimization analysis by assigning, to the generated bead parameter distribution analysis model, the bead parameter distribution analysis condition that is set by the analysis condition setting unit and includes equivalent radiated power (ERP) calculated by the vibration mode analysis under the vibration condition, and acquire the optimal bead parameter distribution using the selected one bead parameter as a design variable, and the optimal bead distribution determination unit is configured to acquire, for each single bead-arranged area set by the single bead-arranged area setting unit, bead parameter distribution with which the ERP of the panel part model is minimized, and determine a bead-arranged area with which the ERP is minimized and the bead parameter distribution acquired for this bead-arranged area as optimal distribution of beads to be provided in the panel part.

Advantageous Effects of Invention

In the present invention, by acquiring optimal distribution of beads to be provided in an automotive panel part, the noise caused by the vibration of the panel part can be reduced, greatly contributing to the improvement in the quietness and the commercial value of the automobile.

BRIEF DESCRIPTION OF DRAWINGS

FIG. 9 is a diagram illustrating, as comparison examples, an example (a) of an analysis result of bead parameter distribution to be provided in the entire surface of a floor panel model, and an example (b) of bead parameter distribution subjected to smoothing.

DESCRIPTION OF EMBODIMENTS

Figure 1:
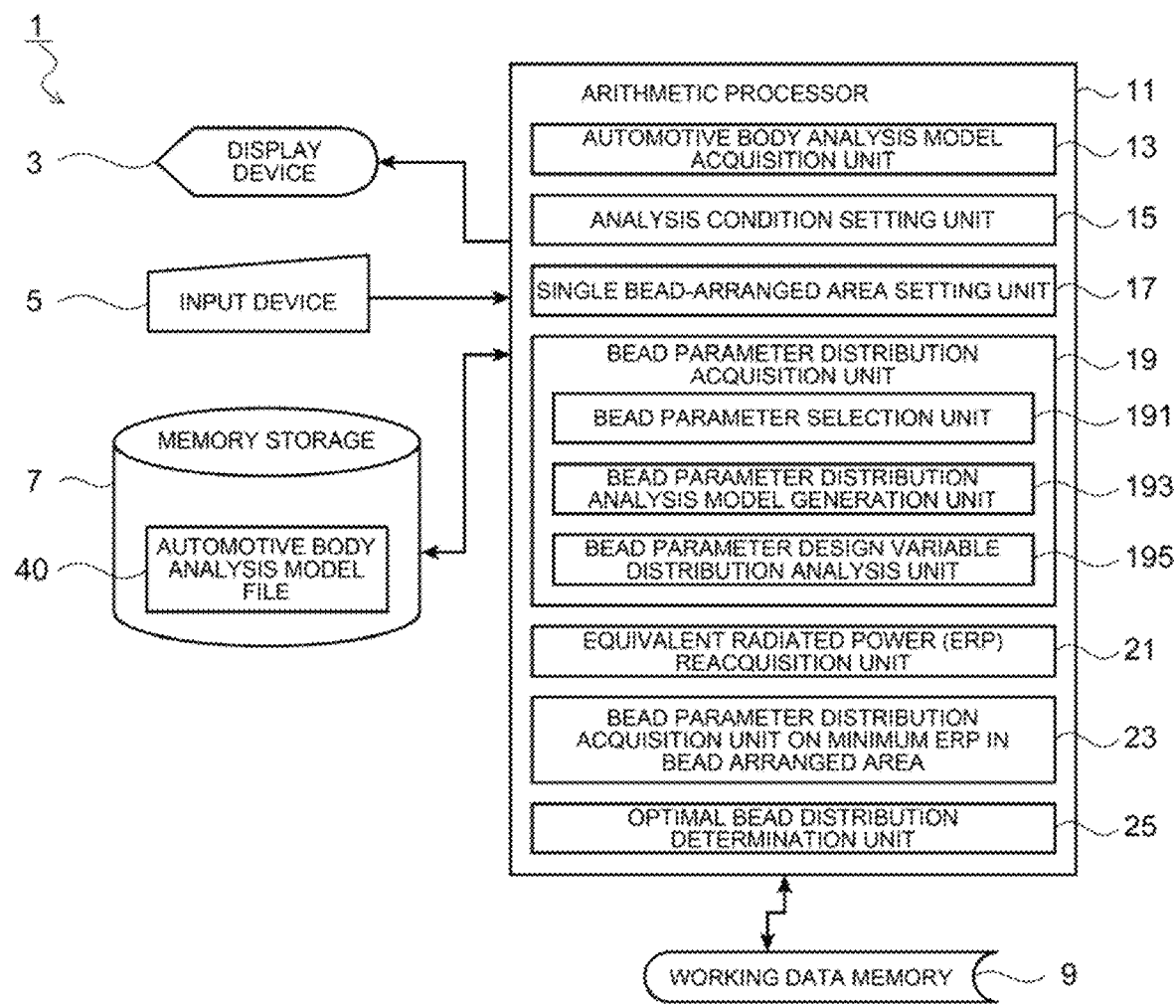
FIG. 1 is a block diagram of a vibration noise reduction analyzer for automotive panel parts according to an embodiment of the present invention.

Prior to describing a vibration noise reduction analysis method and an analyzer for automotive panel parts according to an embodiment of the present invention, an automotive panel part that is an object of the present embodiment is now described. The X, Y, and Z directions illustrated in the drawings of the present application (FIG. 2, FIG. 4, FIG. 7, FIG. 8, and FIG. 9) represent an automotive body front-rear direction, an automotive body width direction, and an automotive body up-down direction, respectively.

<Automotive Panel Part>

Figure 2:
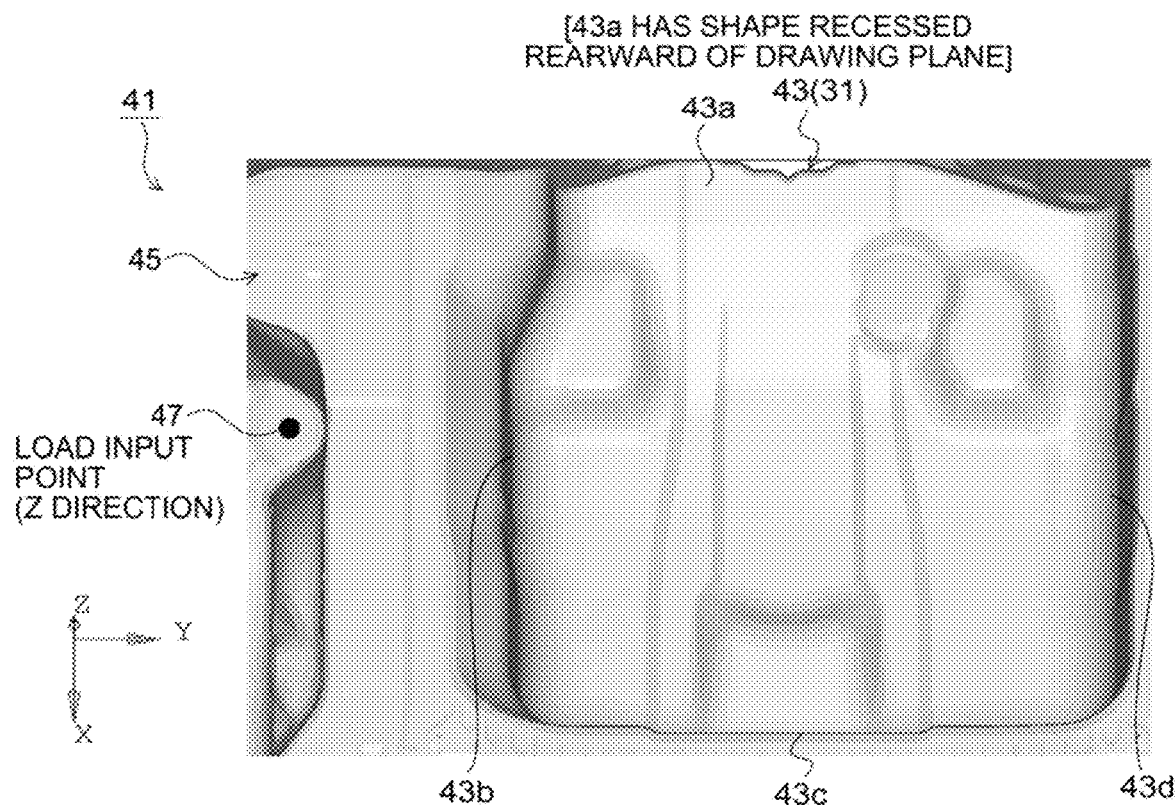
FIG. 2 is a diagram illustrating an automotive floor panel to be analyzed in the present embodiment.

An automotive panel part according to the present invention is an automotive part of a thin sheet structure and may be a floor panel 31 illustrated in FIG. 2 as an example. A top portion 43a of the floor panel 31 (floor panel model 43) has a shape recessed rearward of the drawing plane. When such a panel part vibrates, it becomes a source of road noise and booming noise and exacerbates the noise in the cabin. As such, to reduce the noise caused by the vibration of the panel part, it is effective to provide the panel part with beads to increase the surface rigidity of the panel part and change the eigenfrequency as described above.

<Vibration Noise Reduction Analyzer for Automotive Panel Parts>

Next, the configuration of a vibration noise reduction analyzer for automotive panel parts (hereinafter, simply referred to as a "vibration noise reduction analyzer") according to the present embodiment is described below.

A vibration noise reduction analyzer 1 according to the present embodiment is used to acquire optimal bead parameter distribution (bead position, bead shape at each position, size, angle, orientation) of beads to be provided in an automotive panel part to reduce noise caused by the vibration of the panel part, is formed by a personal computer (PC) and the like, and includes a display device 3, an input device 5, a memory storage 7, a working data memory 9, and an arithmetic processor 11 as illustrated in FIG. 1. The display device 3, the input device 5, the memory storage 7, and the working data memory 9 are connected to the arithmetic processor 11, and their functions are performed in response to commands from the arithmetic processor 11. Hereinafter, each configuration of the vibration noise reduction analyzer 1 is described using an example of acquiring optimal bead distribution to be provided in the floor panel 31 illustrated in FIG. 2 as a panel part.

<<Display Device>>

The display device 3 is used for displaying analysis results and the like, and is formed by a liquid crystal monitor and the like.

<<Input Device>>

The input device 5 is used for display instruction for an automotive body analysis model file 40 and condition input by the operator, for example, and is formed by a keyboard, a mouse, and the like.

<<Memory Storage>>

The memory storage 7 is used to store various files such as the automotive body analysis model file 40, and is formed by a hard disk and the like.

As illustrated in FIG. 2, an automotive body analysis model 41 includes a floor panel model 43, in which the floor panel 31 is modeled with two-dimensional elements, and an entire automotive body model 45, in which the entire automotive body frame is modeled with two-dimensional elements and/or three-dimensional elements. The automotive body analysis model file 40 stores therein various types of information of the automotive body analysis model 41. The entire automotive body model 45 illustrated in FIG. 2 is a part of the entire automotive body. Various types of information stored in the automotive body analysis model file 40 include information on elements and nodes of the automotive body analysis model 41 (the floor panel model 43 and the entire automotive body model 45), information on material property, and the like.

<<Working Data Memory>>

The working data memory 9 is used for temporary saving (storage) and calculation of data used by the arithmetic processor 11, and is formed by random access memory (RAM) and the like.

<<Arithmetic Processor>>

As illustrated in FIG. 1, the arithmetic processor 11 includes an automotive body analysis model acquisition unit 13, an analysis condition setting unit 15, a single bead-arranged area setting unit 17, a bead parameter distribution acquisition unit 19, an equivalent radiated power (ERP) reacquisition unit 21, a bead parameter distribution acquisition unit 23 on minimum ERP in the single bead-arranged area, and an optimal bead distribution determination unit 25, and is formed by a central processing unit (CPU) of a PC or the like. Each unit functions when the CPU executes a predetermined computer program. The function of each of the above units in the arithmetic processor 11 is now described.

(Automotive Body Analysis Model Acquisition Unit)

The automotive body analysis model acquisition unit 13 acquires an automotive body analysis model including a panel part model modeled using two-dimensional elements. In the present embodiment, it is acquired as an automotive body analysis model 41 that includes a floor panel model 43, in which the floor panel 31 illustrated in FIG. 2 is modeled with two-dimensional elements, and an entire automotive body model 45, in which the entire automotive body frame is modeled with two-dimensional elements and/or three-dimensional elements. The automotive body analysis model 41 can be acquired by reading the element information and material property information of the automotive body analysis model 41 from the automotive body analysis model file 40 stored in the memory storage 7.

The automotive body analysis model acquired by the automotive body analysis model acquisition unit 13 is not limited to a model including a panel part model and an entire automotive body model, and may be a model including an automotive body partial model (not illustrated) that includes a plurality of automotive body frame part models and a panel part model, or a model that only includes a panel part model.

(Analysis Condition Setting Unit)

The analysis condition setting unit 15 sets bead parameter distribution analysis conditions for optimization analysis that acquires bead parameter distribution regarding beads to be provided in the floor panel model 43 (bead parameter distribution analysis), and vibration conditions in vibration mode analysis.

The bead parameter distribution analysis conditions include an objective condition and a constraint condition. The objective condition is a condition set depending on a purpose of the bead parameter distribution analysis. In the present invention, the objective condition is to minimize the equivalent radiated power (ERP) of the floor panel model 43 with a design variable, which is one of the bead parameters. The equivalent radiated power (ERP) will be described below. The constraint condition is a constraint imposed when bead parameter distribution analysis is performed. In the present embodiment, the constraint condition is a bead area ratio of less than or equal to 50%. The bead area ratio is the ratio of the area occupied by the beads of the bead parameter (position) distribution acquired by the bead parameter distribution analysis to the area of the bead-arranged area set in the floor panel model 43.

The vibration conditions are analysis conditions related to vibration mode analysis, and set the position to which a cyclic load is applied in a bead parameter distribution analysis model, which is generated by a bead parameter distribution analysis model generation unit 193 to be described below, the vibrational amplitude value and the vibration period of the cyclic load, and the position to restrict the bead parameter distribution analysis model. The vibration mode analysis is performed to calculate the equivalent radiated power (ERP) resulting from the vibration of the floor panel model 43, and is performed by the bead parameter distribution acquisition unit 19 and the equivalent radiated power (ERP) reacquisition unit 21, which will be described below.

Figure 4:
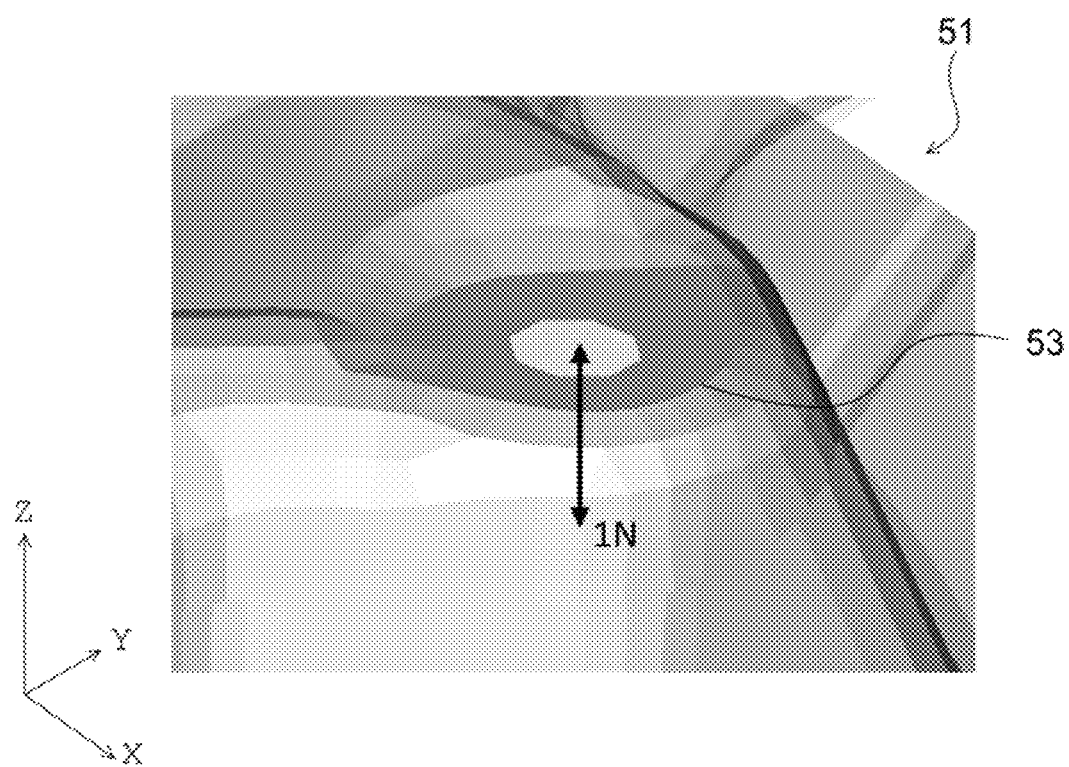
FIG. 4 is a diagram illustrating the position and the direction in which a cyclic load is applied in the bead parameter distribution analysis model in the present embodiment.

FIG. 4 illustrates an example in which a cyclic load (vibrational amplitude value 1N) is applied to a rear shock portion 53 (corresponding to a rear shock portion 47 illustrated in FIG. 2) in the right side of the automotive body in a bead parameter distribution analysis model 51 as a load input point. The vibration conditions are not limited to those that apply a cyclic load, and may be conditions that apply a cyclic displacement (vibrational; amplitude, vibration period) to a predetermined position of the bead parameter distribution analysis model 51.

(Single bead-Arranged area Setting Unit)

The single bead-arranged area setting unit 17 sets a single bead-arranged area among a plurality of bead-arranged areas in which the floor panel model 43 illustrated in FIG. 2 is provided with beads 49. In the present embodiment, the top portion 43*a* and side wall portions 43*b* to 43*d* of the floor panel model 43 are set as bead-arranged areas, and the entire surface of the floor panel model 43 is set as a bead-arranged area for comparison.

(Bead Parameter Distribution Acquisition Unit)

The bead parameter distribution acquisition unit 19 acquires bead parameter distribution to be provided in the single bead-arranged area that is set by the single bead-arranged area setting unit 17, under the bead parameter distribution analysis conditions that are set by the analysis condition setting unit 15 and include the equivalent radiated power (ERP) calculated from the vibration conditions through vibration mode analysis, and includes a bead parameter selection unit 191, the bead parameter distribution analysis model generation unit 193, and a bead parameter design variable distribution analysis unit 195, as illustrated in FIG. 1.

The bead parameter selection unit 191 selects one bead parameter regarding the basic geometry of beads 49 to be provided in the single bead-arranged area set in the floor panel model 43.

Figure 3:
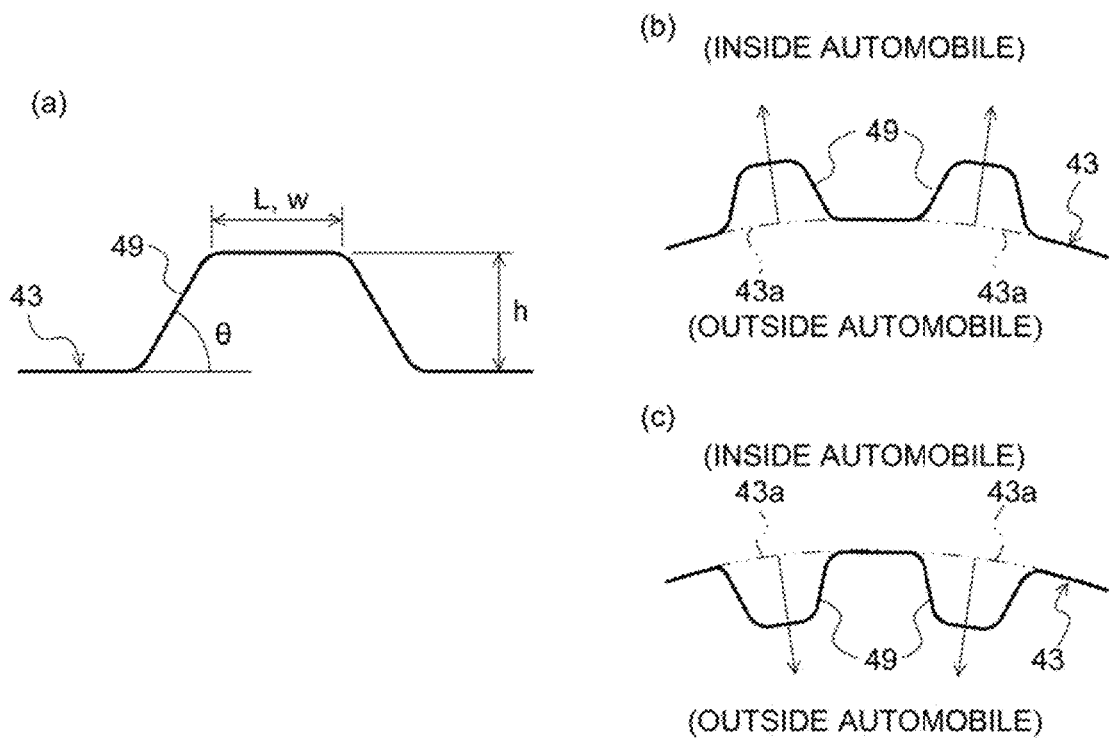
FIG. 3 is a diagram illustrating the basic geometry (shape, size, angle, orientation) of beads set in a bead parameter distribution analysis model in the present embodiment.

As illustrated in FIG. 3 for example, the basic geometry of a bead 49 includes the shape (circular), the size (length (diameter) L, width (diameter) w, height h), and the angle θ of the bead 49 to be provided in the floor panel model 43, and the orientation of the bead 49 (protruding inside the automobile or protruding outside the automobile). The bead parameters to be selected by the bead parameter selection unit 191 include the shape of the bead 49 (for example, a circle, a rectangle, a square, an ellipse, a rhombus, an oval, or the like in a plan view), the upper limit value and the lower limit value of each of the length L, the width w, the angle θ, and the height h of the bead, and the possible orientation of the bead 49.

As for the possible orientation of a bead 49, for the circular beads 49 illustrated in FIG. 3(*b*) and FIG. 3(*c*) for example, protruding inside the automobile or protruding outside the automobile is set. However, in the bead parameter distribution analysis, the height h of a bead 49 may be either a positive value or a negative value, and the orientation of the bead 49 may be set such that it protrudes inside the automobile when the height h is a positive value, and it protrudes outside the automobile when the height h is a negative value.

FIG. 3 illustrates an example in which beads 49 are provided that are circular in a plan view and protrude in a normal direction with respect to the top portion 43*a* of the floor panel model 43.

The bead parameter distribution analysis model generation unit 193 sets one bead parameter selected by the bead parameter selection unit 191 as a design variable in the automotive body analysis model 41, and generates a bead parameter distribution analysis model 51 for calculating bead parameter distribution regarding beads 49 to be provided in the single bead-arranged area.

First, in the range of the bead parameters selected by the bead parameter selection unit 191, variables regarding the bead parameters (shape, size (e.g., length L, width w or height h), angle, and orientation) are set. Then, one of the variables regarding the bead parameters is selected as a design variable (for example, height h), and the selected design variable is set in the single bead-arranged area in the floor panel model 43 that is set in the automotive body analysis model 41 (FIG. 2) by the single bead-arranged area setting unit 17 so that a bead parameter distribution analysis model 51 is generated.

The bead parameter design variable distribution analysis unit 195 performs optimization analysis (bead parameter distribution analysis) by assigning the bead parameter distribution analysis conditions, which are set by the analysis condition setting unit 15 and include the equivalent radiated power (ERP) calculated by the vibration mode analysis under the vibration conditions, to the bead parameter distribution analysis model 51, which is generated by the bead parameter distribution analysis model generation unit 193, and acquires optimal distribution using the one bead parameter selected by the bead parameter selection unit 191 as a design variable.

The specific procedure of the bead parameter design variable distribution analysis unit 195 is as follows. First, the vibration conditions set by the analysis condition setting unit 15 are assigned to the bead parameter distribution analysis model of each design variable to perform vibration mode analysis. Based on the result of this vibration mode analysis, the equivalent radiated power (ERP) is calculated using the following Equation (1). The equivalent radiated power (ERP) is an index indicating the acoustic properties radiated from a vibrating panel surface, and is proportional to the product of the area of the radiation surface radiating sound (the surface of the floor panel model 43) and the square of the vibration velocity of the radiation surface as defined by Equation (1).

$$ERP = \eta * (1/2) C * RHO * \Sigma (A_i * v_i^2) \quad (1)$$

In Equation (1), q represents the radiation loss coefficient, C represents the acoustic velocity, RHO represents the material density of the floor panel model 43, Ai represents the area of a two-dimensional element i of the single bead-arranged area of the floor panel model 43, and vi represents the vibration velocity of the two-dimensional element i. As the vibration velocity vi, the value acquired for each two-dimensional element i by the vibration mode analysis of the bead parameter distribution analysis model is assigned.

Then, the distribution of the selected one bead parameter in the set single bead-arranged area is calculated so as to satisfy the bead parameter distribution analysis conditions, which are set by the analysis condition setting unit 15 and include the equivalent radiated power (ERP) calculated by the vibration mode analysis under the vibration conditions.

That is, under the constraint condition (for example, a bead area ratio of less than or equal to 50%), which is a bead parameter distribution analysis condition, and with the objective condition being minimizing the ERP calculated by Equation (1), the design variables set in bead parameter distribution analysis models are updated to perform analysis process that acquires, for each design variable, one bead parameter distribution with which the ERP of the floor panel model 43 is minimized.

With such an analysis process, the design variable set in a bead parameter distribution analysis model is a continuously changing value, and the magnitude of the value represents the contribution of the bead to the objective condition. Thus, bead parameter distribution is acquired based on the value of the design variable (for example, height h) acquired by the analysis process of the bead parameter distribution and other variables (position, shape, length, width, angle, and orientation) regarding the bead parameters selected by the bead parameter selection unit 191.

The analysis process by the bead parameter design variable distribution analysis unit 195 may be any process as long as it can calculate the shape of the bead provided in the panel part model so as to satisfy the objective condition under a predetermined constraint condition. For example, topography optimization is preferable.

(Equivalent Radiated Power (ERP) Reacquisition Unit)

The equivalent radiated power (ERP) reacquisition unit 21 reacquires the equivalent radiated power (ERP) of the floor panel model 43 in which the bead parameter distribution acquired by the bead parameter distribution acquisition unit 19 is set.

Specifically, the bead parameter distribution acquired by the bead parameter distribution acquisition unit 19 is set in the floor panel model 43, vibration mode analysis is performed on the floor panel model 43 in which the bead parameter distribution is set, and the vibration velocity vi acquired by this vibration mode analysis is substituted into Equation (1) described above to calculate the equivalent radiated power (ERP).

For example, there is a concern about an error in the bead parameter distribution analysis due to the order in which the bead parameters are selected from the bead parameters, but this error can be reduced by the equivalent radiated power (ERP) reacquisition unit 21.

Alternatively, the error in the bead parameter distribution analysis can be reduced by performing optimization analysis of bead parameter distribution (bead parameter distribution analysis) by changing the order in which the bead parameters are selected as design variables, and by reacquiring the equivalent radiated power (ERP) by the equivalent radiated power (ERP) reacquisition unit 21.

Nevertheless, the ERP that is calculated by Equation (1) in the bead parameter distribution analysis performed by the bead parameter design variable distribution analysis unit 195 may be acquired, or the equivalent radiated power (ERP) reacquisition unit 21 may be omitted.

(Bead Parameter Distribution Acquisition Unit on Minimum ERP in Bead-Arranged Area)

The bead parameter distribution acquisition unit 23 on minimum ERP in bead-arranged area changes the bead parameter to be acquired by the bead parameter distribution acquisition unit 19, repeats the processes of the bead parameter distribution acquisition unit 19 and the equivalent radiated power (ERP) reacquisition unit 21, and acquires the bead parameter distribution with which the ERP is minimized for the set single bead-arranged area.

(Optimal Bead Distribution Determination Unit)

The optimal bead distribution determination unit 25 changes the single bead-arranged area in the floor panel model 43, repeats the processes of the single bead-arranged area setting unit 17, the bead parameter distribution acquisition unit 19, the equivalent radiated power (ERP) reacquisition unit 21, and the bead parameter distribution acquisition unit 23 on minimum ERP in bead-arranged area, and determines a bead-arranged area in the floor panel model 43 and the bead parameter distribution acquired for this bead-arranged area as optimal bead distribution to be provided in the floor panel 31.

That is, the optimal bead distribution determination unit 25 acquires, for each bead-arranged area set among a plurality of bead-arranged areas by the single bead-arranged area setting unit 17, the bead parameter distribution with which the ERP of the floor panel model 43 is minimized, and determines the bead-arranged area with which the ERP is minimized and the bead parameter distribution acquired for this bead-arranged area as optimal distribution of beads to be provided in the floor panel model 43.

The optimal bead distribution determination unit 25 may have a function/means for smoothing the bead parameter distribution acquired for the bead-arranged area with which the ERP is minimized. Then, the bead parameter distribution subjected to smoothing may be determined as optimal distribution of beads 49 to be provided in the floor panel 31. A specific example in which smoothing is performed on the bead parameter distribution acquired for the bead-arranged area with the minimum ERP will be described below.

<Vibration Noise Reduction Analysis Method for Automotive Panel Parts>

Next, a vibration noise reduction analysis method for automotive panel parts (hereinafter, simply referred to as "vibration noise reduction analysis method") according to the present embodiment is described below.

Figure 5:
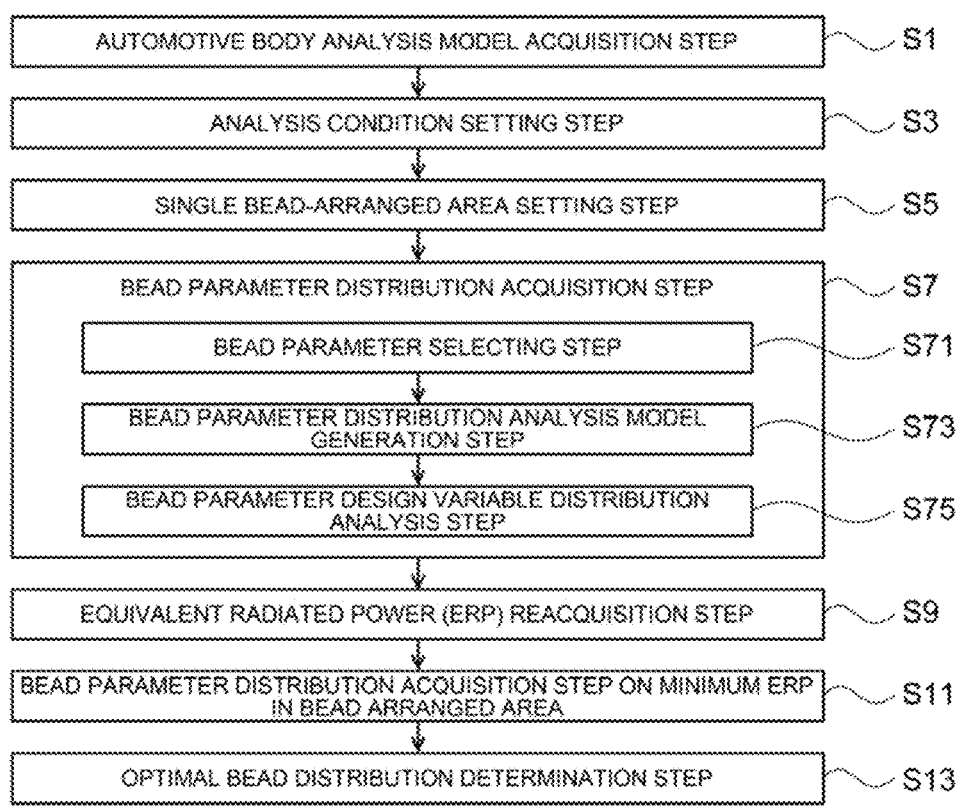
FIG. 5 is a diagram illustrating an outline of a process of a vibration noise reduction analysis method for automotive panel parts according to an embodiment of the present invention.
Figure 6:
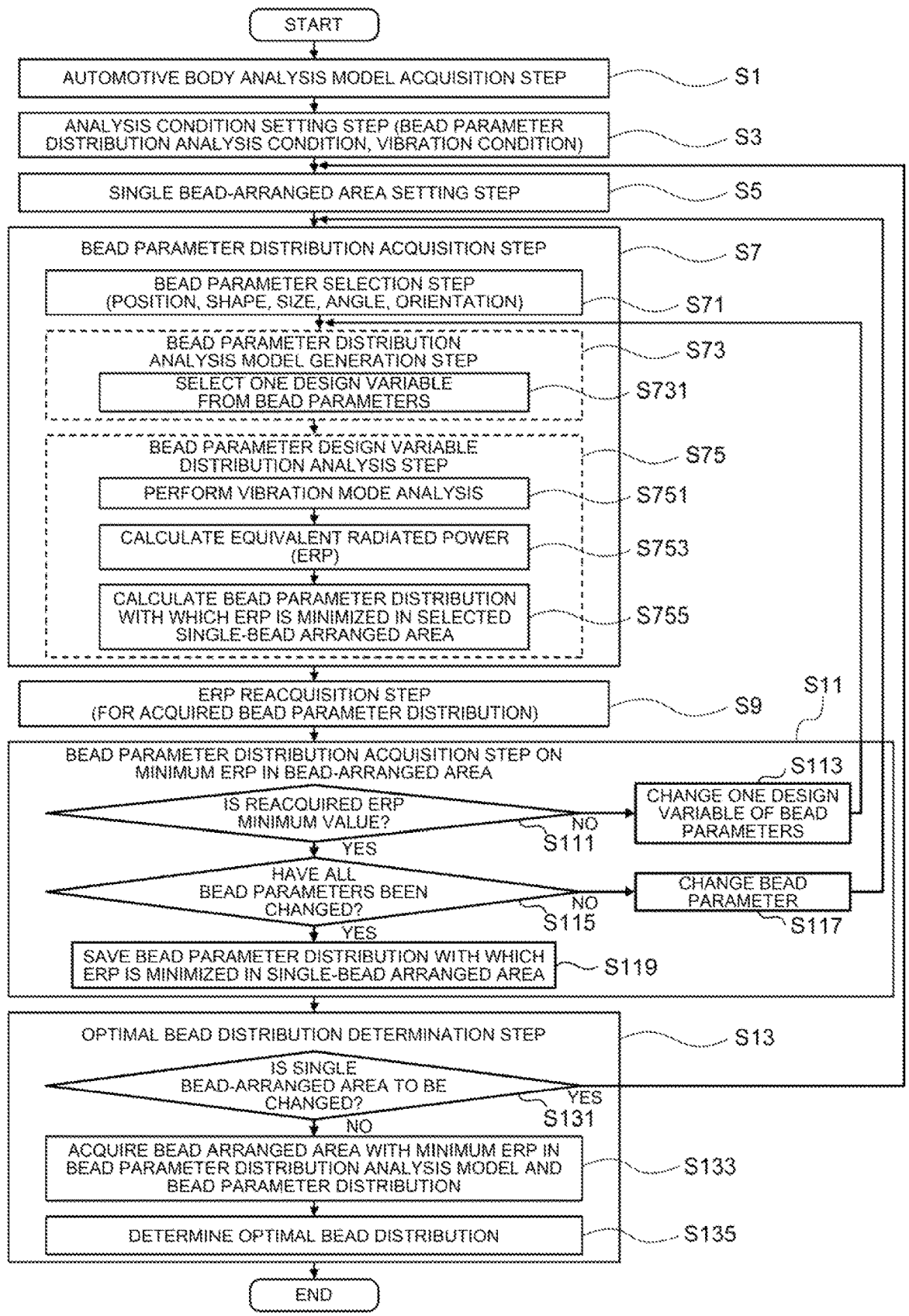
FIG. 6 is a diagram illustrating a flow of a vibration noise reduction analysis method for automotive panel parts according to an embodiment of the present invention in detail.

The vibration noise reduction analysis method according to the present embodiment acquires optimal distribution of beads to be provided in an automotive panel part to reduce noise caused by the vibration of the panel part and includes, as illustrated in FIG. 5, an automotive body analysis model acquisition step S1, an analysis condition setting step S3, a single bead-arranged area setting step S5, a bead parameter distribution acquisition step S7, an equivalent radiated power (ERP) reacquisition step S9, a bead parameter distribution acquisition step on minimum ERP in bead-arranged areas S11, and an optimal bead distribution determination step S13. FIG. 6 illustrates details of each step illustrated in FIG. 5.

Hereinafter, using an example of acquiring optimal distribution of beads 49 to be provided in the floor panel 31 illustrated in FIG. 2 as a panel part, the above-mentioned steps are described referring to the flow illustrated in FIG. 6. In the following description, each step is executed using the vibration noise reduction analyzer 1 (FIG. 1) formed by a computer.

<<Automotive Body Analysis Model Acquisition Step>>

The automotive body analysis model acquisition step S1 is a step of acquiring an automotive body analysis model 41 including a floor panel model 43 in which the floor panel 31 (FIG. 2) is modeled with two-dimensional elements, and is performed by the automotive body analysis model acquisition unit 13 in the vibration noise reduction analyzer 1.

<<Analysis Condition Setting Step>>

The analysis condition setting step S3 is a step of setting bead parameter distribution analysis conditions for optimization analysis that acquires bead parameter distribution regarding beads to be provided in the floor panel model 43 (bead parameter distribution analysis), and vibration conditions in vibration mode analysis, and is performed by the analysis condition setting unit 15 in the vibration noise reduction analyzer 1.

The bead parameter distribution analysis conditions include an objective condition set depending on a purpose of the bead parameter distribution analysis, and a constraint condition that is a constraint imposed when bead parameter distribution analysis is performed. In the present embodiment, the objective condition is to minimize the equivalent radiated power (ERP) of the floor panel model 43 in which one of the bead parameters is set as a design variable. The constraint condition is a constraint imposed when bead parameter distribution analysis is performed, and is set to a bead area ratio, which is the ratio of the area occupied by the beads in a single bead-arranged area, of less than or equal to 50%.

The vibration conditions are analysis conditions related to vibration mode analysis for acquiring the equivalent radiated power (ERP) resulting from the vibration of the floor panel model 43, and set the position to which a cyclic load is applied in a bead parameter distribution analysis model, which is generated in a bead parameter distribution analysis model generation step S73 to be described below, the vibration amplitude value and the vaibratino period of the cyclic load, and the position to restrict the bead parameter distribution analysis model. The vibration mode analysis is performed to calculate the equivalent radiated power (ERP) resulting from the vibration of the floor panel model 43, and is performed in the bead parameter distribution acquisition step S7 and the equivalent radiated power (ERP) reacquisition step S9, which will be described below.

<<Single Bead-Arranged Area Setting Step>>

The single bead-arranged area setting step S5 is a step of setting a single bead-arranged area among a plurality of bead-arranged areas in which the floor panel model 43 is provided with beads 49, and is performed by the single bead-arranged area setting unit 17 in the vibration noise reduction analyzer 1.

<<Bead Parameter Distribution Acquisition Step>>

The bead parameter distribution acquisition step S7 acquires the bead parameter distribution to be provided in the single bead-arranged area set in the single bead-arranged area setting step S5, under the bead parameter distribution analysis conditions that include the equivalent radiated power (ERP) calculated by the vibration mode analysis under the vibration conditions and are set in the analysis condition setting step S3, and is performed by the bead parameter distribution acquisition unit 19 in the vibration noise reduction analyzer 1.

The bead parameter distribution acquisition step S7 includes a bead parameter selection step S71 of selecting one of bead parameters (position, shape, size, angle, orientation) regarding beads to be provided in the single bead-arranged area, a bead parameter distribution analysis model generation step S73 of setting the selected one bead parameter in the automotive body analysis model 41 as a design variable and generating a bead parameter distribution analysis model 51 for calculating the bead parameter distribution to be provided in the single bead-arranged area, and a bead parameter design variable distribution analysis step S75 of performing optimization analysis by assigning the bead parameter distribution analysis conditions, which are set in the analysis condition setting step S3 and include the equivalent radiated power (ERP) calculated by the vibration mode analysis under the vibration conditions, to the generated bead parameter distribution analysis model 51, and acquiring the optimal bead parameter distribution using the selected one bead parameter as a design variable.

The bead parameter selection step S71 is a step of selecting a bead parameter regarding beads to be provided in the floor panel model 43, and is performed by the bead parameter selection unit 191 in the vibration noise reduction analyzer 1.

As illustrated in FIG. 3 described above, the bead parameters regarding a bead includes the position of the bead 49, the shape (circular), the size of the bead 49 (length L, width w, height h), the angle $\theta$, and the orientation of the bead 49 (e.g., protruding inside the automobile or protruding outside the automobile). In the bead parameter selection step S71, the upper and lower limits of the length L, the width w, the angle $\theta$, and the height h of the bead 49, the possible orientation of the bead 49, or the like are selected as bead parameters.

The bead parameter distribution analysis model generation step S73 is a step of setting the one bead parameter selected in the bead parameter selection step S71 in the automotive body analysis model 41 as a design variable and generating a bead parameter distribution analysis model 51 for calculating the bead parameter distribution of beads to be provided in the single bead-arranged area, and is performed by the bead parameter distribution analysis model generation unit 193 in the vibration noise reduction analyzer 1.

The bead parameter design variable distribution analysis step S75 is a step of performing optimization analysis by assigning the bead parameter distribution analysis conditions, which are set in the analysis condition setting step S3 and include the equivalent radiated power (ERP) calculated by the vibration mode analysis under the vibration conditions, to the bead parameter distribution analysis model 51, which is generated in the bead parameter design variable distribution analysis step S73, and acquiring the optimal bead parameter distribution using the selected one bead parameter as a design variable, and is performed by the bead parameter design variable distribution analysis unit 195 in the vibration noise reduction analyzer 1.

Specifically, first, the vibration conditions set in the analysis condition setting step S3 are assigned to the bead parameter distribution analysis model 51 of each design variable to perform vibration mode analysis (S751). By this vibration mode analysis, the vibration velocity vi of each two-dimensional element i in the set single bead-arranged area of the floor panel model 43 is acquired with the selected design variable.

Then, the vibration velocity vi acquired by the vibration mode analysis is substituted into the above Equation (1) to calculate the equivalent radiated power (ERP) of the floor panel model 43 (S753).

Then, the distribution of the selected design variable to be provided in the single bead-arranged area is acquired so as to satisfy the bead parameter distribution analysis conditions (objective condition and constraint condition) set in the analysis condition setting step S3. That is, under the constraint condition, which is a bead parameter distribution analysis condition, and with the objective condition being minimizing the equivalent radiated power (ERP) calculated by Equation (1), the design variables set in bead parameter distribution analysis models 51 are updated to perform optimization analysis process that acquires, for each design variable, one bead parameter distribution with which the ERP of the floor panel model 43 is minimized.

With such an analysis process, the design variable set in a bead parameter distribution analysis model 51 is a continuously changing value, and the magnitude of the value represents the contribution of the bead to the objective condition. Thus, bead parameter distribution (bead position, size at each bead position (length, width, height, etc.), angle, orientation) is acquired based on the value of the design variable acquired by the analysis process of the bead parameter distribution.

<<Equivalent Radiated Power (ERP) Reacquisition Step>>

The equivalent radiated power (ERP) reacquisition step S9 reacquires the equivalent radiated power (ERP) of the floor panel model 43 in which the bead parameter distribution acquired in the bead parameter distribution acquisition step S7 is set, and is performed by the equivalent radiated power (ERP) reacquisition unit 21 in the vibration noise reduction analyzer 1.

In the equivalent radiated power (ERP) reacquisition step S9, vibration mode analysis is performed on the floor panel model 43 in which the bead parameter distribution acquired in the bead parameter distribution acquisition step S7 is set, and the vibration velocity vi acquired by this vibration mode analysis is substituted into Equation (1) described above to calculate the equivalent radiated power (ERP).

For example, there is a concern about an error in the bead parameter distribution analysis due to the order in which the bead parameters are selected from the bead parameters, for example, but this error can be reduced by reacquiring the equivalent radiated power (ERP) in the equivalent radiated power (ERP) reacquisition step S9.

Alternatively, the error in the bead parameter distribution analysis can be reduced by performing optimization analysis of bead parameter distribution (bead parameter distribution analysis) by changing the order in which the bead parameters are selected as design variables, and by reacquiring the equivalent radiated power (ERP) in the equivalent radiated power (ERP) reacquisition step S9.

Nevertheless, the ERP that is calculated in step S753, which calculates the equivalent radiated power (ERP) in the bead parameter design variable distribution analysis step S75, may be acquired, or the equivalent radiated power (ERP) reacquisition step S9 may be omitted.

<<Bead Parameter Distribution Acquisition Step on Minimum ERP in Bead Arranged Area>>

The bead parameter distribution acquisition step S11 on minimum ERP in bead-arranged area changes the bead parameter acquired in the bead parameter distribution acquisition step S7, repeats the bead parameter distribution acquisition step S7 and the equivalent radiated power (ERP) reacquisition step S9, acquires the bead parameter distribution with which the ERP is minimized for the single bead-arranged area set in the single bead-arranged area setting step S5, and is performed by the bead parameter distribution acquisition unit 23 on minimum ERP in bead-arranged area in the vibration noise reduction analyzer 1.

FIG. 6 illustrates the specific process in the bead parameter distribution acquisition step S11 on minimum ERP in bead-arranged area.

First, it is determined whether the equivalent radiated power (ERP) reacquired in the equivalent radiated power (ERP) reacquisition step S9 is the minimum value (S111). Here, the minimum value of ERP is the minimum value, in the single bead-arranged area, of the ERP acquired for each design variable distribution that is acquired for each of the design variables selected from the bead parameters.

If the acquired ERP is not the minimum value in the bead parameter distribution acquisition step S11 on minimum ERP in bead-arranged area, one design variable regarding the bead parameters is changed (S113), and the bead parameter distribution analysis model generation step S73, the bead parameter design variable distribution analysis step S75, and the equivalent radiated power (ERP) reacquisition step S9 are repeated.)

If the ERP is the minimum value, it is determined whether the bead parameter distribution is acquired by changing all bead parameters, such as bead position, shape, size, angle, and orientation (S115). For example, the distribution that minimizes the ERP is first acquired in relation to the position of the bead, the ERP is then minimized in relation to another bead parameter, and the minimum ERP is acquired in relation to yet another bead parameter with the minimized bead parameter kept unchanged. This process is sequentially repeated.

If it is determined that not all bead parameters have been changed, the bead parameter is changed to another bead parameter (S117), and the bead parameter distribution acquisition step (S7) and the equivalent radiated power (ERP) reacquisition step (S9) are repeated. In contrast, if it is determined that all bead parameters have been changed, the bead parameter distribution with the minimum ERP in the single bead-arranged area is saved (S119).

<<Optimal Bead Distribution Determination Step>>

The optimal bead distribution determination step S13 is a step of changing the single bead-arranged area in the floor panel model 43, repeating the single bead-arranged area setting step S5, the bead parameter distribution acquisition step S7, the equivalent radiated power (ERP) reacquisition step S9, and the bead parameter distribution acquisition step S1? on minimum ERP in the single bead-arranged area, and determining an area in the floor panel 31 to be provided with beads and the bead distribution in the area to be provided with the beads, and is performed by the optimal bead distribution determination unit 25 in the vibration noise reduction analyzer 1.

Specifically, if the bead parameter distribution is not acquired for all of the bead-arranged areas set in the floor panel model 43, it is determined that the single bead-arranged area is to be changed (S131), and the setting of another single bead-arranged area (S5), the acquirement of bead parameter distribution (S7), the reacquirement of the equivalent radiated power (ERP) (S9), and the acquirement of bead parameter distribution with the minimum ERP (S11) are repeated until bead parameter distribution is acquired for all bead-arranged areas.

If bead parameter distribution is acquired for all bead-arranged areas by bead parameter distribution analysis, it is determined that the single bead-arranged area is not to be changed (S131). Then, among the minimum ERP values acquired for the respective bead-arranged areas, the bead-arranged area with the lowest ERP is selected, and the bead parameter distribution (position, shape, size, angle, orientation) acquired for the selected bead-arranged area is acquired (S133). Furthermore, the bead parameter distribution acquired for the selected bead-arranged area is determined as optimal distribution of the beads to be provided in the floor panel 31 (S135).

The optimal bead distribution determination step S13 may perform smoothing to smooth the bead parameter distribution acquired for the bead-arranged area with the minimum ERP, and the bead parameter distribution subjected to the smoothing may be determined as the bead distribution to be provided in the bead-arranged area of the floor panel 31. A specific example of bead parameter distribution subjected to smoothing in the optimal bead distribution determination step S13 will be described below.

Figure 7:
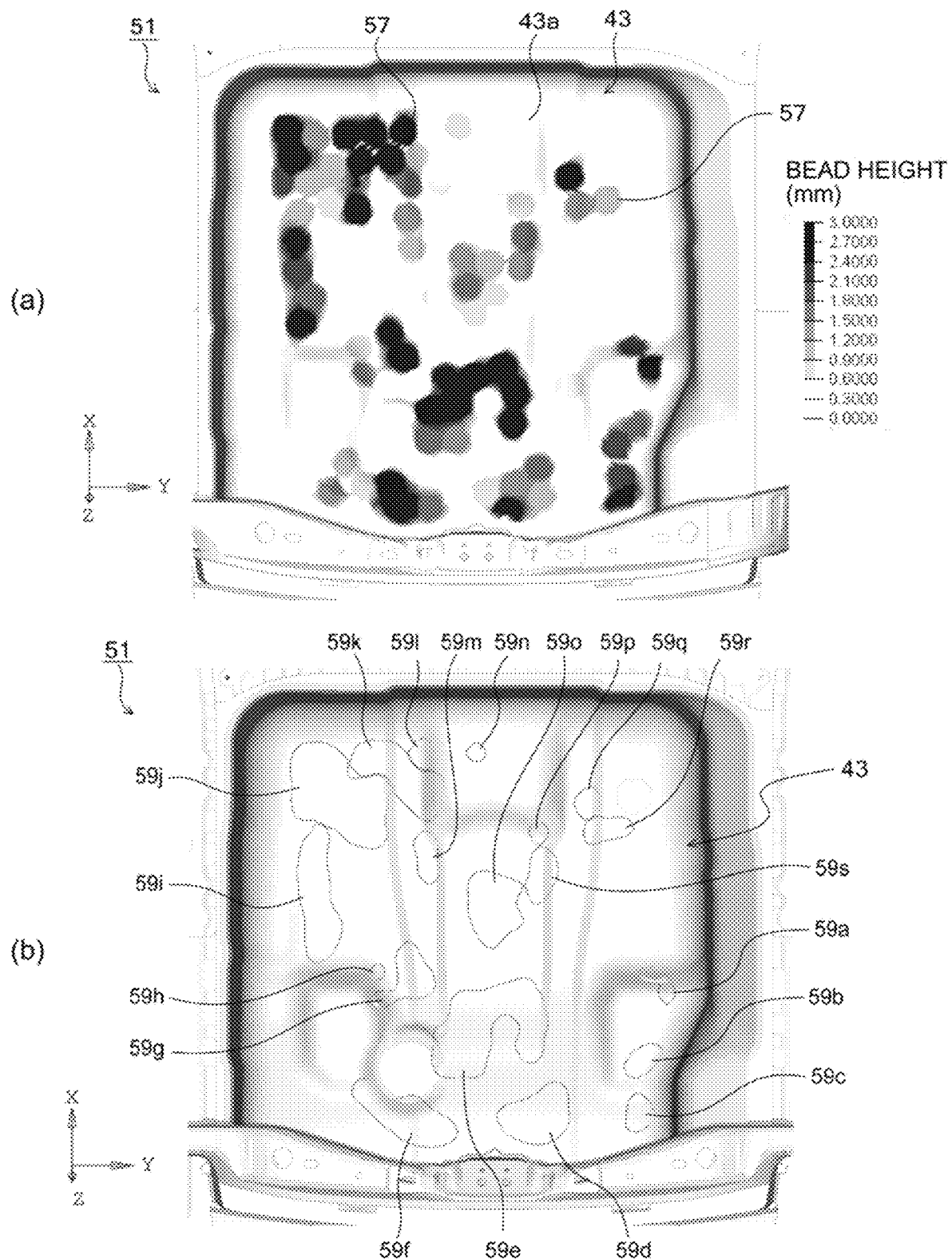
FIG. 7 is a diagram illustrating an example (a) of an analysis result of bead parameter distribution to be provided in a top portion of a floor panel model, and an example (b) of bead parameter distribution subjected to smoothing.
Figure 8:
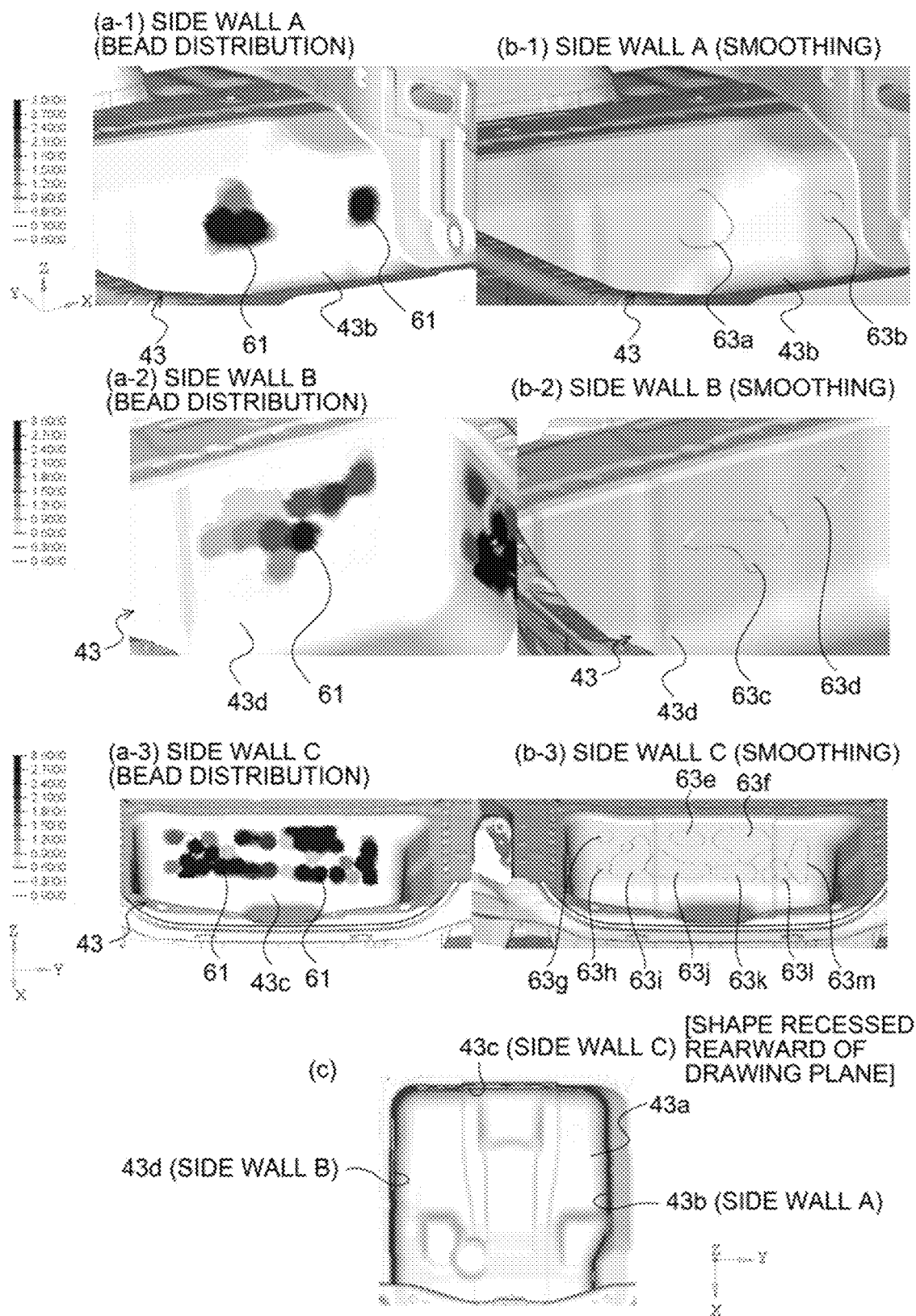
FIG. 8 is a diagram illustrating examples (a-1), (a-2), and (a-3) of analysis results of bead parameter distribution to be provided in side wall portions of a floor panel model, examples (b-1), (b-2), and (b-3) of bead parameter distribution subjected to smoothing, and the positions (c) of the side wall portions (side wall A, side wall B, and side wall C).

FIGS. 7 and 8 illustrate examples of bead parameter distribution acquired by the vibration noise reduction analysis method and the analyzer 1 according to the present embodiment for a floor panel model 43, in which the floor panel 31 is modeled as a panel part and which includes the top portion 43a and the side wall portions 43b, 43c, and 43d.

The beads 57 illustrated in FIG. 7 and the beads 61 illustrated in FIG. 8 are bead parameter distribution acquired by performing, on an automotive body analysis model 41 including the floor panel model 43, bead parameter distribution analysis (optimization analysis) in which the top portion 43a (FIG. 7) or the side wall portions 43b to 43d (FIG. 8) are set as the bead-arranged areas in the floor panel model 43 of a bead parameter distribution analysis model 51 generated by setting, as the design variable, the bead height h, which is one of the bead parameters.

In this bead parameter distribution analysis, as the bead basic geometry, the bead length L and width (diameter) w were set to 35 mm, the height h was set to 3.0 mm, the angle θ was set to 60°, and the bead orientation was set to both sides (inside/outside the automobile), and the bead parameters regarding the bead basic geometry, bead parameter distribution analysis conditions, and vibration conditions were set. As the bead parameter distribution analysis conditions, the objective condition was set to minimizing the equivalent radiated power (ERP) with the set design variable, and the constraint condition was set to a bead area ratio of 50%. As the vibration conditions, a cyclic load of 1N (vibration amplitude value 1N) was applied in the Z direction (the up-down direction of the automotive body) with the rear shock portion 53 in the right side of the vehicle as the load input point (see FIG. 2 and FIG. 4). Topography optimization was used for the analysis process in the bead parameter distribution analysis.

Table 1 illustrates the results of the equivalent radiated power (ERP) of the floor panel model 43 in which the distribution of the beads 57 (FIG. 7), which was acquired using the vibration noise reduction analyzer 1 according to an embodiment of the present invention and by setting the top portion 43a as the bead-arranged area, was set in the top portion 43a, and the equivalent radiated power (ERP) of a floor panel model 43 of the original shape that was not provided with beads for comparison.

TABLE 1

| Floor panel model | Frequency band (Hz) | Equivalent radiated power (dB) | Difference from original shape |
|---|---|---|---|
| Original shape | 80-90 | 42.2 | — |
| With bead (Top portion) | 80-90 | 30.8 | −11.4 dB |

As can be seen from Table 1, compared with the equivalent radiated power calculated for the floor panel model 43 of the original shape that was not provided with beads, the equivalent radiated power calculated for the floor panel model 43 in which the optimal distribution of the beads 57 acquired using the vibration noise reduction analyzer 1 according to the present embodiment was set in the top portion 43a was reduced by 11.4 dB.

Table 2 illustrates the results of the equivalent radiated power of the floor panel model 43 in which the beads 61 (FIGS. 8(a-1) to (a-3)), which were bead parameter distribution acquired using the vibration noise reduction analyzer 1 according to the present invention and by setting the side wall portions 43b to 43d (FIG. 8(c)) as the bead-arranged area, were set in each of the side wall portions 43b to 43d, and the equivalent radiated power of a floor panel model 43 of the original shape that was not provided with beads for comparison.

TABLE 2

| Floor panel model | Frequency band (Hz) | Equivalent radiated power (dB) | Difference from original shape |
|---|---|---|---|
| Original shape | 80-90 | 42.2 | — |
| With bead (Side wall portion) | 80-90 | 37.8 | −4.4 dB |

As can be seen from Table 2, compared with the equivalent radiated power calculated for the floor panel model 43 of the original shape that was not provided with beads, the equivalent radiated power calculated for the floor panel model 43 in which the beads 61, which are the bead parameter distribution acquired by performing the bead parameter distribution analysis with the vibration noise reduction analyzer 1 according to the present invention, were set in the side wall portions 43b to 43d was reduced by 4.4 dB.

Furthermore, as a comparison example, Table 3 illustrates the result of comparison between the equivalent radiated power calculated for the floor panel model 43 in which beads 65 were set over the entire surface including the top portion 43a and the side wall portions 43b to 43d as illustrated FIG. 9, and the equivalent radiated power of a floor panel model 43 of the original shape that was not provided with beads.

TABLE 3

| Floor panel model | Frequency band (Hz) | Equivalent radiated power (dB) | Difference from original shape |
|---|---|---|---|
| Original shape | 80-90 | 42.2 | — |
| With bead (Entire surface) | 80-90 | 32.5 | −9.7 dB |

As can be seen from Table 3, compared with the equivalent radiated power calculated for the floor panel model 43 of the original shape that was not provided with beads, the equivalent radiated power calculated for the floor panel model 43 in which the beads 65, which were bead parameter distribution acquired by performing bead parameter distribution analysis with the vibration noise reduction analyzer 1 according to the present invention, were set in the entire surface was reduced by 9.7 dB.

In the comparison example, since beads 65 are also provided in the areas in which the inclinations of the punch shoulder portion and the die shoulder portion of the floor panel model 43 change, the beads provided in the tool of press forming of the punch shoulder portion and the tool of press forming of the die shoulder portion are displaced during the press forming, making it difficult to form desired bead shapes.

Furthermore, there is also a problem where the unevenness of beads with various inclinations provided in the tool of press forming hinders the removal of the tool of press forming after the press forming. Additionally, since vibration noise occurs in flat or near-flat areas of a part, it is not necessary to provide beads in the sections having inclined surfaces and high stiffness, such as the punch shoulder portion and the die shoulder portion. Also, when a bead is provided in a flange portion, a gap may be created on the mating surface with other parts, hindering the joining and thus reducing the joining strength.

In the present invention, by avoiding the areas in which the above-mentioned problems are likely to occur when provided with beads, such as the punch shoulder portion and the die shoulder portion, and setting bead-arranged areas in flat or near-flat areas, optimal bead parameter distribution is acquired for each bead-arranged area, allowing for the precise prevention of vibration noise.

Furthermore, the results of smoothing the bead parameter distribution acquired by bead parameter distribution analysis were studied. FIG. 7(*b*) illustrates beads 59*a* to 59*s* acquired by smoothing the bead parameter distribution (beads 57) illustrated in FIG. 7(*a*), FIGS. 8(*b*-1) to (*b*-3) illustrate the beads 63*a* to 63*m* acquired by smoothing the bead parameter distribution (beads 61) illustrated in FIG. 8(*a*-1) to FIG. 8(*a*-3), and FIG. 9(*b*) illustrates the beads 67*a* to 67*w* acquired by smoothing the bead parameter distribution (beads 65) illustrated in FIG. 9(*a*).

As illustrated in FIG. 7(*b*), FIGS. 8(*b*-1) to (*b*-3), and FIG. 9(*b*), when it is difficult to manufacture a panel part provided with the beads 57, beads 61, or beads 65 according to the shape of the bead parameter distribution acquired by bead parameter distribution analysis, a panel part with beads can be easily manufactured by determining the beads 59*a* to 59*s*, beads 63*a* to 63*m*, and beads 67*a* to 67*w*, which are subjected to smoothing, as the distribution of beads to be provided in the panel part.

In the above example, the bead parameter distribution is acquired by setting the entire surface of the top portion 43*a* as the bead-arranged area. However, in the present invention, the top portion 43*a* may be divided into a plurality of regions, one or two or more regions of these divided regions may be subjected to bead parameter distribution analysis as bead-arranged areas, and the bead-arranged area with which the ERP is minimized and its bead parameter distribution may be acquired. The same applies to the side wall portions.

As described above, according to the vibration noise reduction analysis method and the analyzer 1 according to the present invention, optimal distribution of beads to be provided in an automotive panel part can be accurately acquired, and by providing the panel part with beads according to the acquired optimal bead distribution, the equivalent radiated power radiated from the panel part can be reduced, thereby reducing the noise caused by vibration. This can contribute to the improvement in the quietness and the commercial value of the automobile.

INDUSTRIAL APPLICABILITY

According to the present invention, a vibration noise reduction analysis method and an analyzer for automotive panel parts are provided that can efficiently acquire, for a bead to be provided in an automotive panel part to reduce noise caused by the vibration of the panel part, optimal bead distribution (position, shape, size, angle, and orientation) that enables practical manufacturing.

REFERENCE SIGNS LIST

1 Vibration noise reduction analyzer
3 Display device
5 Input device
7 memory storage
9 Working data memory
11 Arithmetic processor
13 Automotive body analysis model acquisition unit
15 Analysis condition setting unit
17 Single bead-arranged area setting unit
19 Bead parameter distribution acquisition unit
191 Bead parameter selection unit
193 Bead parameter distribution analysis model generation unit
195 Bead parameter design variable distribution analysis unit
21 Equivalent radiated power (ERP) reacquisition unit
23 Bead parameter distribution acquisition unit on minimum ERP in bead-arranged area
25 Optimal bead distribution determination unit
31 Floor panel
31*a* Top portion
40 Automotive body analysis model file
41 Automotive Body analysis model
43 Floor panel model
43*a* Top portion
43*b*, 43*c*, 43*d* Side wall portion
45 Entire automotive body model
47 Rear shock portion
49 bead (basic geometry)
51 Bead parameter distribution analysis model
53 Rear shock portion
57 Bead
59*a* to 59*r* Bead after smoothing
61 Bead
63*a* to 63*m* Bead after smoothing
65 Bead
67*a* to 67*w* Bead after smoothing

The invention claimed is:

1. A vibration noise reduction analysis method for automotive panel parts, the method acquiring optimal distribution of beads to be provided in an automotive panel part to reduce noise caused by vibration of the panel part, and being executed by a computer, the method comprising:
   an automotive body analysis model acquisition step of acquiring an automotive body analysis model including a panel part model in which the automotive panel part is modeled with a two-dimensional element;
   an analysis condition setting step of setting a bead parameter distribution analysis condition for optimization analysis that acquires bead parameter distribution regarding a bead to be provided in the panel part model, and a vibration condition in vibration mode analysis;

a single bead-arranged area setting step of setting a single bead-arranged area among a plurality of bead-arranged areas in which the panel part model is provided with the bead;

a bead parameter distribution acquisition step of acquiring the bead parameter distribution to be provided in the set single bead-arranged area under the bead parameter distribution analysis condition including equivalent radiated power (ERP) calculated by the vibration mode analysis under the vibration condition;

an equivalent radiated power (ERP) reacquisition step of reacquiring equivalent radiated power (ERP) of the panel part model in which the acquired bead parameter distribution is set;

bead parameter distribution acquisition step on a minimum ERP in bead-arranged area of changing a bead parameter to be acquired in the bead parameter distribution acquisition step, repeating the bead parameter distribution acquisition step and the equivalent radiated power (ERP) reacquisition step, and acquiring bead parameter distribution with which the ERP is minimized for the set single bead-arranged area; and an optimal bead distribution determination step of changing the single bead-arranged area in the panel part model, repeating the single bead-arranged area setting step, the bead parameter distribution acquisition step, the equivalent radiated power (ERP) reacquisition step, and the bead parameter distribution acquisition step on a minimum ERP in bead-arranged area, and determining a bead-arranged area in the panel part model and the bead parameter distribution acquired for this bead-arranged area as optimal bead distribution to be provided in the panel part, wherein the bead parameter distribution acquisition step includes:
a bead parameter selection step of selecting one bead parameter regarding a bead to be provided in the set single bead-arranged area;

a bead parameter distribution analysis model generation step of setting the selected one bead parameter in the automotive body analysis model as a design variable and generating a bead parameter distribution analysis model for calculating the bead parameter distribution to be provided in the single bead-arranged area; and a bead parameter design variable distribution analysis step of performing optimization analysis by assigning, to the generated bead parameter distribution analysis model, the bead parameter distribution analysis conditions that are set in the analysis condition setting step and includes equivalent radiated power (ERP) calculated by the vibration mode analysis under the vibration condition, and acquiring the optimal bead parameter distribution using the selected one bead parameter as a design variable, and the optimal bead distribution determination step includes acquiring, for each single bead-arranged area set in the single bead-arranged area setting step, bead parameter distribution with which the ERP of the panel part model is minimized, and determining a bead-arranged area with which the ERP is minimized and the bead parameter distribution acquired for this bead-arranged area as optimal distribution of beads to be provided in the panel part.

2. A vibration noise reduction analyzer for automotive panel parts, the vibration noise reduction analyzer being configured to acquire optimal distribution of beads to be provided in an automotive panel part to reduce noise caused by vibration of the panel part, the analyzer vibration noise reduction analyzer comprising:

an automotive body analysis model acquisition unit configured to acquire an automotive body analysis model including a panel part model in which the automotive panel part is modeled with a two-dimensional element;

an analysis condition setting unit configured to set a bead parameter distribution analysis condition for optimization analysis that acquires bead parameter distribution regarding a bead to be provided in the panel part model, and a vibration condition in vibration mode analysis;

a single bead-arranged area setting unit configured to set a single bead-arranged area among a plurality of bead-arranged areas in which the panel part model is provided with the bead;

a bead parameter distribution acquisition unit configured to acquire the bead parameter distribution to be provided in the set single bead-arranged area under the bead parameter distribution analysis condition including equivalent radiated power (ERP) calculated by the vibration mode analysis under the vibration condition;

an equivalent radiated power (ERP) reacquisition unit configured to reacquire equivalent radiated power (ERP) of the panel part model in which the acquired bead parameter distribution is set;

a bead parameter distribution acquisition unit on a minimum ERP in bead-arranged area configured to
change a bead parameter to be acquired by the bead parameter distribution acquisition unit,
repeat processes of the bead parameter distribution acquisition unit and the equivalent radiated power (ERP) reacquisition unit, and
acquire bead parameter distribution with which the ERP is minimized for the set single bead-arranged area; and an optimal bead distribution determination unit configured to
change the single bead-arranged area in the panel part model,
repeat processes performed by the single bead-arranged area setting unit, the bead parameter distribution acquisition unit, the equivalent radiated power (ERP) reacquisition unit, and the minimum ERP bead parameter distribution acquisition unit on a minimum ERP in bead-arranged area, and
determine a bead-arranged area in the panel part model and the bead parameter distribution acquired for this bead-arranged area as optimal bead distribution to be provided in the panel part, wherein the bead parameter distribution acquisition unit includes:
a bead parameter selection unit configured to select one bead parameter regarding a bead to be provided in the set single bead-arranged area;

a bead parameter distribution analysis model generation unit configured to set the selected one bead parameter in the automotive body analysis model as a design variable and generates a bead parameter distribution analysis model for calculating the bead parameter distribution to be provided in the single bead-arranged area; and a bead parameter design variable distribution analysis unit configured to
perform optimization analysis by assigning, to the generated bead parameter distribution analysis model, the bead parameter distribution analysis condition that is set by the analysis condition setting unit and includes equivalent radiated power (ERP) calculated by the vibration mode analysis under the vibration condition, and acquire the optimal bead parameter distribution using the selected one bead parameter as a design variable, and the optimal bead distribution determination unit is configured to acquire, for each single bead-arranged area set by the single bead-arranged area setting unit, bead parameter distribution with which the ERP of the panel part model is minimized, and determine a bead-arranged area with which the ERP is minimized and the bead parameter distribution acquired for this bead-arranged area as optimal distribution of beads to be provided in the panel part.

* * * * *